(12) United States Patent
Cohen et al.

(10) Patent No.: US 12,052,041 B2
(45) Date of Patent: Jul. 30, 2024

(54) ELECTRONIC DEVICE HAVING REMOVABLE TRAY

(71) Applicant: Apple Inc., Cupertino, CA (US)

(72) Inventors: Sawyer I. Cohen, Menlo Park, CA (US); Allegra Shum, Menlo Park, CA (US); Christopher B. Lyons, Cupertino, CA (US); Ibuki Kamei, San Jose, CA (US); Matthew W. Miller, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 546 days.

(21) Appl. No.: 17/174,280

(22) Filed: Feb. 11, 2021

(65) Prior Publication Data

US 2022/0123775 A1 Apr. 21, 2022

Related U.S. Application Data

(60) Provisional application No. 63/094,312, filed on Oct. 20, 2020.

(51) Int. Cl.
*H04B 1/3816* (2015.01)
*G06K 13/08* (2006.01)

(52) U.S. Cl.
CPC ....... *H04B 1/3816* (2013.01); *G06K 13/0831* (2013.01)

(58) Field of Classification Search
CPC ................ H04B 1/3816; H04B 1/3818; G06K 13/0831; G06K 13/0812
See application file for complete search history.

(56) References Cited

U.S. PATENT DOCUMENTS

2005/0018397 A1* 1/2005 Kay ......................... G06F 1/184
2015/0155651 A1* 6/2015 Ejiri ..................... G06K 7/0021
439/521

FOREIGN PATENT DOCUMENTS

CN 106505335 3/2017

* cited by examiner

*Primary Examiner* — Ankur Jain
(74) *Attorney, Agent, or Firm* — Brownstein Hyatt Farber Schreck, LLP

(57) ABSTRACT

A portable electronic device includes a housing member defining at least a portion of a side surface of the portable electronic device, a subscriber identity module (SIM) tray extending through a hole defined through the housing member and movable between a seated position and an at least partially ejected position, a tray ejector arm configured to at least partially eject the SIM tray from the portable electronic device in response to a user actuation, and a biasing member configured to bias the tray ejector arm against the SIM tray when the SIM tray is in the seated position.

20 Claims, 13 Drawing Sheets

ELECTRONIC DEVICE HAVING REMOVABLE TRAY

CROSS-REFERENCE TO RELATED APPLICATION(S)

This application is a nonprovisional patent application of and claims the benefit of U.S. Patent Application No. 63/094,312, filed Oct. 20, 2020 and titled "Electronic Device Having Removable Tray," the disclosure of which is hereby incorporated herein by reference in its entirety.

FIELD

The subject matter of this disclosure relates generally to electronic devices, and more particularly, to electronic devices with at least partially removable trays for holding removable media.

BACKGROUND

Modern consumer electronic devices take many shapes and forms, and have numerous uses and functions. Smartphones, for example, facilitate communications, productivity, entertainment, and the like. Such devices may include numerous systems to facilitate such functionality. For example, a smartphone may include wireless communications systems for connecting with other devices to send and receive voice and data content. In some cases, wireless communications systems may facilitate communications via cellular networks to provide connectivity to other devices (e.g., other smartphones), networks (e.g., the Internet), or the like.

SUMMARY

A portable electronic device includes a housing member defining at least a portion of a side surface of the portable electronic device, a subscriber identity module (SIM) tray extending through a hole defined through the housing member and movable between a seated position and an at least partially ejected position, a tray ejector arm configured to at least partially eject the SIM tray from the portable electronic device in response to a user actuation, and a biasing member configured to bias the tray ejector arm against the SIM tray when the SIM tray is in the seated position. The portion of the side surface of the portable electronic device may be a first portion of the side surface of the portable electronic device, and the SIM tray, when in the seated position, may define a second portion of the side surface of the portable electronic device. The portable electronic device may further include an ejector plug configured to receive an actuation force from an ejector tool, and a push rod configured to receive the actuation force from the ejector plug and impart the actuation force to the tray ejector arm. The biasing member may be coupled to the ejector plug and impart the biasing force on the tray ejector arm via the push rod. The biasing member may be a conical spring.

The portable electronic device may further include a SIM tray retaining mechanism configured to retain the SIM tray in the seated position, the biasing member may impart a biasing force on the SIM tray when the SIM tray is in the seated position, and the SIM tray retaining mechanism may impart a retention force on the SIM tray when the SIM tray is in the seated position, the retention force opposing the biasing force to retain the SIM tray in the seated position. The SIM tray retaining mechanism may include a spring member in contact with the SIM tray.

A portable electronic device includes a display, a housing surrounding the display and defining a hole, a subscriber identity module (SIM) tray positioned in the hole, a SIM tray retaining mechanism configured to retain the SIM tray in a seated position, a SIM tray ejection mechanism configured to displace the SIM tray in an outward direction, the SIM tray ejection mechanism comprising a push rod configured to receive an actuation force, a tray ejector arm configured to displace the SIM tray in response to the actuation force being imparted on the push rod, and a biasing member configured to bias the tray ejector arm against the SIM tray when the SIM tray is in the seated position. The tray ejector arm may be configured to pivot about a pivot axis defined by a pivot member and may define a first portion extending from the pivot member along a first direction and a second portion extending from the pivot member along a second direction different than the first direction. The push rod may transfer the actuation force to the first portion of the tray ejector arm, and the second portion of the tray ejector arm may contact the SIM tray to displace the SIM tray in response to the actuation force being imparted on the push rod. The biasing member may be an elastomer member.

The hole may be a first hole, and the portable electronic device may further include an ejector plug positioned at least partially in a second hole defined in the housing, the ejector plug configured to contact the push rod to impart the actuation force to the push rod. The biasing member may be a conical spring retained to the ejector plug.

The biasing member may be a first biasing member configured to impart a first biasing force on the tray ejector arm, the first biasing force acting in a first direction, and the portable electronic device may further include a second biasing member configured to impart a second biasing force on the tray ejector arm, the second biasing force acting in a second direction different than the first direction. The second direction may be parallel to the pivot axis. The first biasing member may be a coil spring, and the second biasing member may be a beam spring.

A subscriber identity module (SIM) tray assembly for an electronic device may include a housing, a tray configured to receive a SIM card, a tray ejector arm configured to at least partially eject the tray from the housing, a push rod configured to, in response to an application of an actuation force to an end of the push rod, apply the actuation force to the tray ejector arm, and a biasing member configured to bias the push rod against the tray ejector arm, thereby biasing the tray ejector arm against the tray.

The actuation force may move the push rod along a first direction, and the tray ejector arm may be configured to pivot about a pivot axis to at least partially eject the tray along a second direction opposite the first direction. The biasing member may be a first biasing member that imparts a first biasing force on the tray ejector arm, the first biasing force acting along a first direction, and the SIM tray assembly may further include a second biasing member configured to impart a second biasing force on the tray ejector arm, the second biasing force acting along a second direction different than the first direction. The SIM tray assembly may further include a cover member extending over the tray, and the second biasing member may be a beam spring integrally formed with the cover member.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
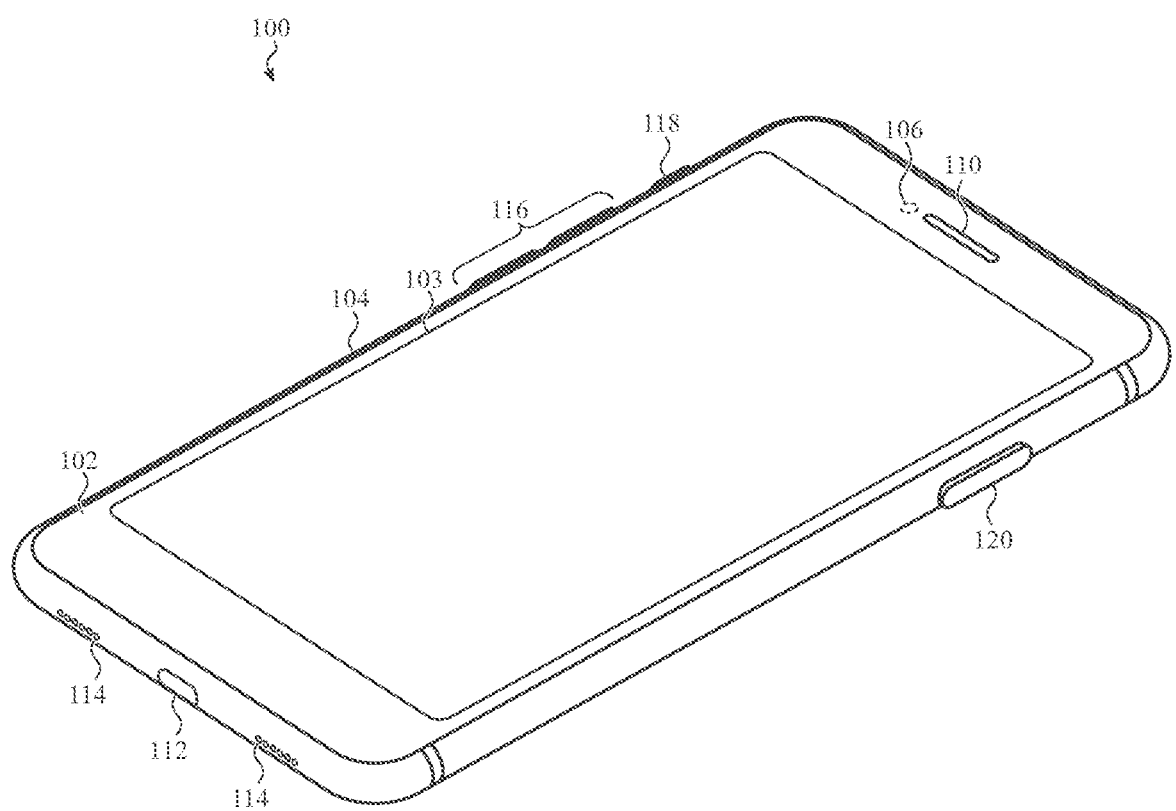
FIGS. 1A-1B depict an example electronic device having a fingerprint-sensing button.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Portable electronic devices as described herein, such as mobile phones, smart watches, tablet computers, and the like, may use wireless communications systems, such as cellular networks, to provide numerous functions, including sending and receiving voice and/or data content. In some cases, such devices use subscriber identity module (SIM) cards to authenticate and/or identify the devices to a wireless network. SIM cards may be removable and/or replaceable so that devices can be used on different networks and/or by different users or user accounts. For example, electronic devices may include removable or partially-removable trays (also referred to as SIM trays) that hold SIM cards and allow the SIM cards to be removed, swapped, replaced, or the like.

In order to provide a removable SIM tray, mechanisms may be provided to facilitate retention and ejection of the SIM tray. For example, the SIM tray should not fall out of place or be ejected from the device during normal use of the device (e.g., absent a specific user actuation of an ejection mechanism or other action specifically intended to eject the SIM tray). However, ejection of the SIM tray should not be unnecessarily difficult or cumbersome. Accordingly, a SIM tray ejection mechanism may be provided to eject the SIM tray in response to an appropriate manipulation by a user (e.g., the application of an actuation force to a component of an ejection mechanism).

A SIM tray ejection mechanism may use moving and/or articulable components in order to secure the SIM tray in a seated position during normal use, and to provide the requisite ejection force on the SIM tray when appropriately actuated by a user. In order to prevent unwanted noise from and/or wear of the SIM tray mechanisms, biasing members such as springs, elastomers, or the like, may be used to bias components into intimate or direct contact with another. For example, a biasing member may ensure that a SIM tray ejector arm maintains contact with a SIM tray during normal operation of the device (e.g., even when the SIM tray is not being ejected and is remaining in a seated position). Biasing members help to take up slack and/or gaps (also referred to as backlash) between components to help prevent the components from rattling or impacting one another during operation of the device, thereby preventing wear and providing a more silent device operation. Biasing members may also help increase the frictional forces of various components to help reduce unintended motion during normal operation of the device. Examples of SIM tray ejection mechanisms, as well as biasing members and other components that help prevent motion of the SIM tray ejection mechanisms during normal operation of a device (e.g., when the SIM tray is seated and is not being ejected) are described herein.

FIG. 1A shows an example electronic device 100 embodied as a mobile phone (e.g., an example of a portable electronic device). While the device 100 is a mobile phone, the concepts presented herein may apply to any appropriate electronic device, including wearable devices (e.g., smartwatches), laptop computers, handheld gaming devices, or any other device that incorporates SIM trays. Accordingly, any reference to an "electronic device" encompasses any and all of the foregoing. Further, while the instant application describes examples of mechanisms for use with SIM trays, this is merely one application for the ejection mechanisms described herein. Indeed, the same or similar mechanisms and techniques may be used for other removable media, such as memory cards (e.g., SD cards, miniSD cards, microSD cards, xD-Picture cards, or the like).

The electronic device 100 includes a cover 102 (e.g., a front cover), such as a glass, plastic, or other substantially transparent material, component, or assembly, attached to a housing 104. The cover 102, which may be referred to as a transparent cover 102, may be positioned over a display 103. The cover 102 may be formed from glass (e.g., a chemically strengthened glass), sapphire, ceramic, glass-ceramic, plastic, or another suitable material. The housing 104 may include one or more metal members coupled together with polymer (or other dielectric) materials. In some cases, the housing 104 is a single piece of metal, a single piece of polymer, or it may use other materials and/or constructions. The housing 104 (and/or housing members of the housing) may define one or more side surfaces of the device 100, which may define exterior side surfaces of the device 100.

The device 100 may also include buttons, switches, and other types of physical input devices. For example, the device 100 may include buttons 116, switches 118, a button 120 (e.g., a power or lock button), and/or other physical input systems. Such input systems may be used to control various operations and functions of the device 100. For example, the buttons 116 may be operative to change speaker volume, and the switch 118 may be operative to switch between "ring" and "silent" modes. The button 120 may include a fingerprint sensor or components thereof.

The display 103 may be at least partially positioned within the interior volume defined by the housing 104. The display 103 may be coupled to the transparent cover 102, such as via an adhesive or other coupling scheme. In some cases, the assembly that includes the display 103 and the transparent cover 102 may be referred to as a top module.

The top module may also include other components, such as touch- and/or force-sensing components, structural members, cameras, biometric sensors (e.g., facial recognition systems), ambient light sensors, or the like.

The display 103, which may also be referred to herein as a display stack, may include a liquid-crystal display (LCD), light-emitting diode display, organic light-emitting diode (OLED) display, an active layer organic light emitting diode (AMOLED) display, organic electroluminescent (EL) display, electrophoretic ink display, or the like. The display 103 may be configured to display graphical outputs, such as graphical user interfaces, that the user may view and interact with. The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor).

The display 103 may include or be associated with one or more touch- and/or force-sensing systems. In some cases, components of the touch- and/or force-sensing systems are integrated with the display stack. For example, electrode layers of a touch- and/or force-sensor may be provided in a stack that includes display components (and is optionally attached to or at least viewable through the cover 102).

The touch- and/or force-sensing systems may use any suitable type of sensing technology, including capacitive sensors, resistive sensors, surface acoustic wave sensors, piezoelectric sensors, resistive sensors, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system.

The device 100 may also include a front-facing camera 106. The front-facing camera 106 may be positioned below or otherwise covered and/or protected by the cover 102.

The device 100 may also include a speaker outlet 110 to provide audio output to a user, such as to a user's ear during voice calls. The device 100 may also include a charging port 112 (e.g., for receiving a power cable for providing power to the device 100 and charging the battery of the device 100). The device 100 may also include loudspeaker openings 114. The loudspeaker openings 114 may allow sound output from an internal speaker system to exit the housing 104. The device 100 may also include one or more microphones. In some cases, a microphone within the housing 104 may be acoustically coupled to the surrounding environment through a loudspeaker opening 114.

Figure 1B:
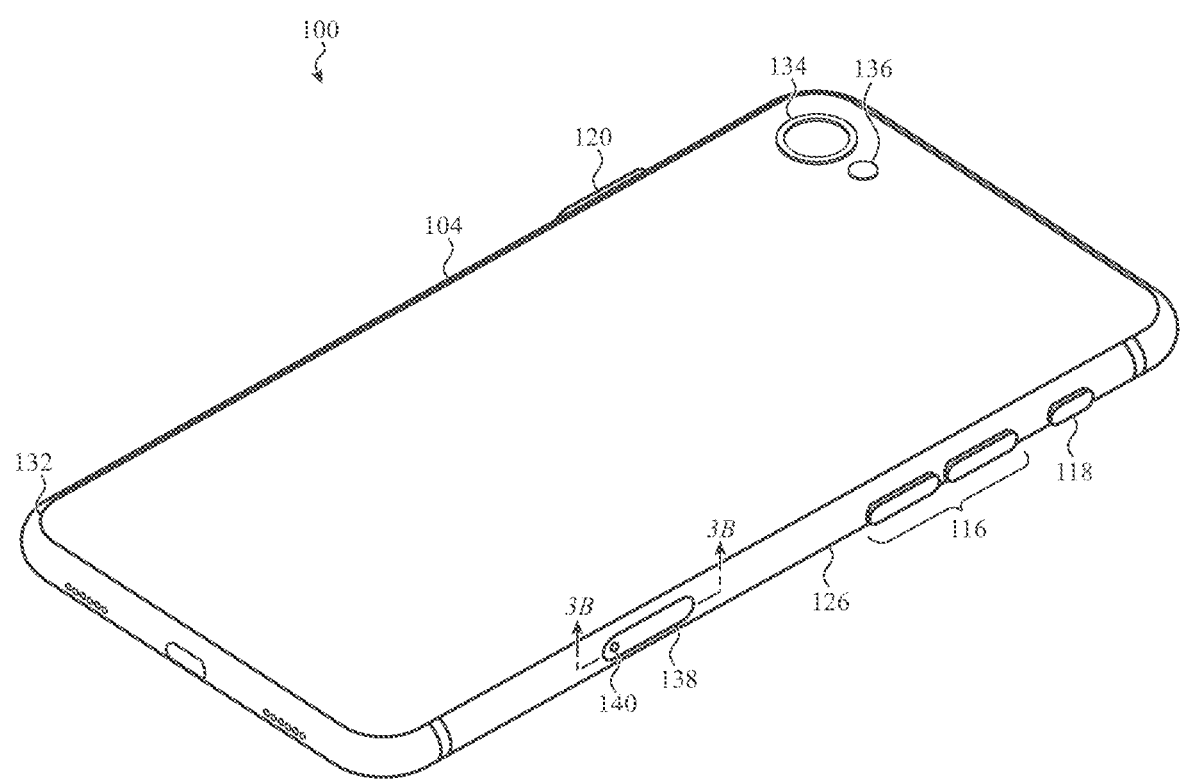

FIG. 1B illustrates a back side of the device 100. The device 100 may include a back cover 132 coupled to the housing 104. The back cover 132 may include a substrate formed of glass, though other suitable materials may alternatively be used (e.g., plastic, sapphire, ceramic, ceramic glass, etc.). The back cover 132 may define a back exterior surface of the device 100. The back cover 132 may include one or more decorative layers on the exterior or interior surface of the substrate. For example, one or more opaque layers may be applied to the interior surface of the substrate (or otherwise positioned along the interior surface of the substrate) to provide a particular appearance to the back side of the device 100. The opaque layer(s) may include a sheet, ink, dye, or combinations of these (or other) layers, materials, or the like. In some cases the opaque layer(s) have a color that substantially matches a color of the housing 104 (e.g., the exterior surfaces of the housing members and the joint structures).

In some cases, the housing 104 may define a back wall of the device 100. For example, a single component or assembly may define the side surfaces and the back wall (and thus the back surface) of the device 100. In some cases, a back cover 132 may be attached to a back wall of a housing 104, such that the back cover 132, and not the back wall of the housing 104, defines the back surface of the device 100.

The device 100 may include a wireless charging system, whereby the device 100 can be powered and/or its battery recharged by an inductive (or other electromagnetic) coupling between a charger and a wireless charging system within the device 100. In such cases, the back cover 132 may be formed of a material that allows and/or facilitates the wireless coupling between the charger and the wireless charging system (e.g., glass).

The device 100 may also include a rear-facing camera 134 and a flash 136 that is configured to illuminate a scene to facilitate capturing images with the camera 134. The flash 136 is configured to illuminate a scene to facilitate capturing images with the camera 134. The flash 136 may include one or more light sources, such as one or more light emitting diodes (e.g., 1, 2, 3, 4, or more LEDs).

The device 100 may also include a SIM tray 138. The SIM tray 138 may extend through a hole defined through the housing 104 (e.g., in a housing member that defines at least part of the housing 104). The SIM tray 138 may be movable between a seated position (as shown in FIG. 1B and FIG. 2C, for example) and an at least partially ejected position (as shown in FIG. 2D, for example). In some cases the SIM tray 138 is fully removable from the deice 100.

When the SIM tray 138 is in the seated position, a portion of the SIM tray 138 may define a portion of a side surface of the device 100. For example, as shown in FIG. 1B, the SIM tray 138 is in the seated position, and a housing member 126 (e.g., part of the housing 104) defines a first portion of a side surface of the device 100, and the SIM tray 138 defines a second portion of the side surface of the device 100. In some cases, the portion of the SIM tray 138 that defines part of the side surface has the same color, finish, appearance, and/or texture (and optionally is formed of the same material) as the housing member 126.

The SIM tray 138 may define a hole 140 through the portion of the SIM tray 138 that defines part of the side surface of the device 100. An ejection tool may be inserted into the hole 140 to apply an actuation force to a SIM tray ejection mechanism to cause the SIM tray 138 to be at least partially ejected from the device 100.

Figure 2A:
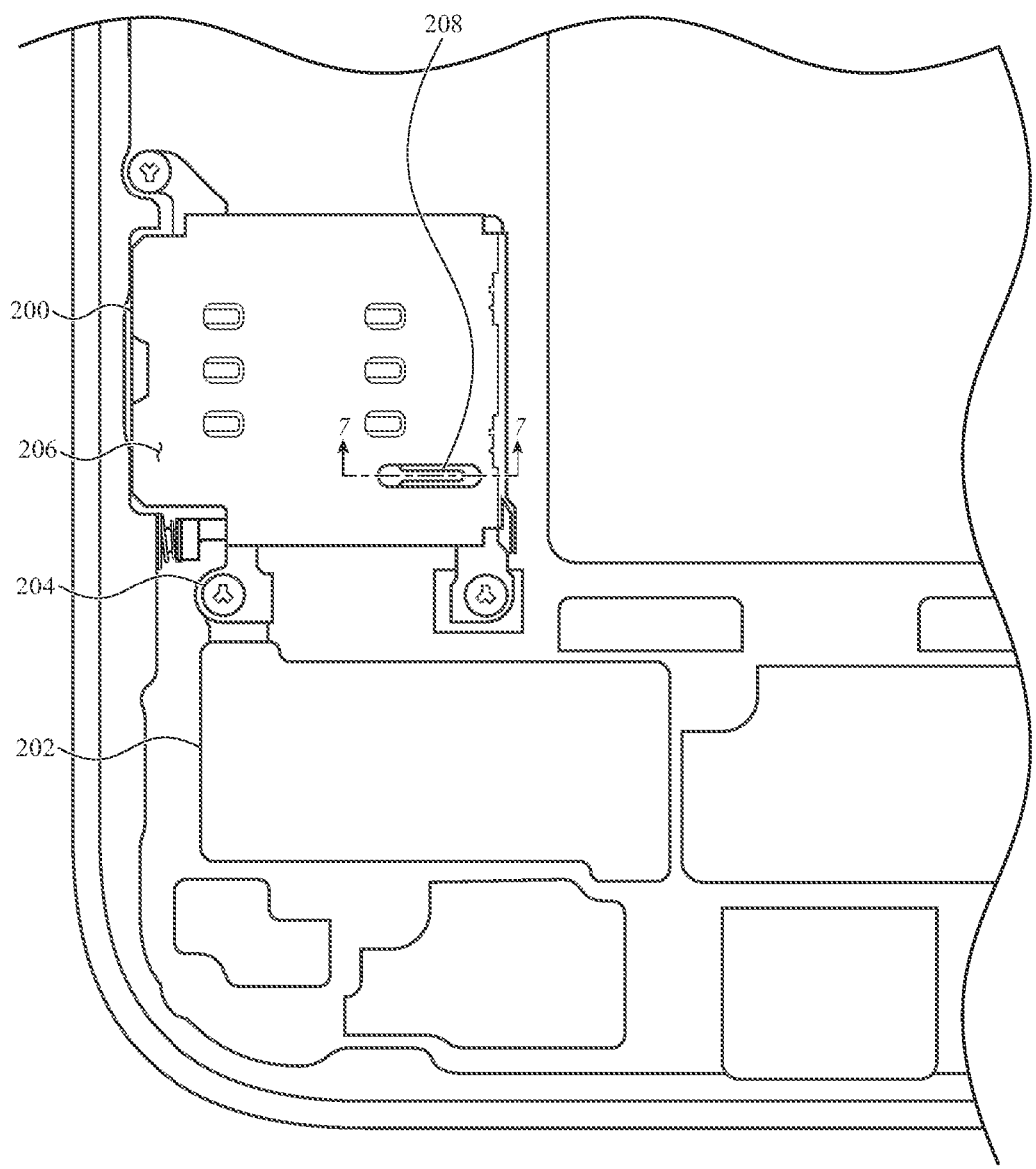
FIG. 2A depicts a portion of the electronic device of FIGS. 1A-1B.

FIG. 2A is partial view of the device 100, showing example internal components of the device 100, and in particular, a SIM tray assembly 200 and a haptic actuator 202. The SIM tray assembly 200 includes, for example, the SIM tray 138 and a SIM tray 138 ejection mechanism, as described herein.

The haptic actuator 202, also referred to as a haptic device or a haptic feedback device, may be configured to produce haptic outputs that are physically detectable by a user. Such haptic outputs may include vibrations, oscillations, taps, or the like, which can be felt by a user when the user is directly or indirectly touching the device 100 (e.g., when the device 100 is in the user's hand, pocket, or the like). In some cases, the haptic actuator 202 is configured to produce haptic outputs having a range from about 0 Hz to about 300 Hz.

In some cases, the haptic actuator 202 and the SIM tray assembly 200 share at least one mounting point in the device 100. For example, as shown in FIG. 2A, the haptic actuator 202 and the SIM tray assembly 200 are both coupled to the device 100 via a common fastener 204. The common fastener 204 may be a screw, bolt, rivet, pin, solder joint, heat-staked member, or the like. The haptic actuator 202 and the SIM tray assembly 200 may each include a respective tab with a respective hole through which the common fastener 204 extends.

In some cases, due to the proximity of the haptic actuator 202 to the SIM tray assembly 200 (e.g., the haptic actuator 202 is adjacent the SIM tray assembly 200), as well as the fact that the haptic actuator 202 and the SIM tray assembly 200 are both attached via a common fastener 204, vibrations, oscillations, or other movements may be imparted to the SIM tray assembly 200 from the haptic actuator 202 during haptic outputs. Such physical disturbances may cause components of the SIM tray assembly 200 to rattle (e.g., cyclically or repeatedly contact each other) during haptic output events, which may produce undesirable wear to the SIM tray assembly 200 and produce unwanted or unpleasant noise during the haptic output. As noted above and described herein, the SIM tray assembly 200 may therefore include biasing members and other structures, components, and/or mechanisms to prevent or reduce the motion and/or rattling of the components.

The SIM tray assembly 200 may include a cover member 206 that extends over the SIM tray 138 (or a portion thereof) when the SIM tray 138 is in the seated position in the device 100. As described herein, the cover member 206 may define a biasing member 208 (e.g., a beam spring) that imparts a biasing force on a SIM tray ejector arm (e.g., the SIM tray ejector arm 220, FIG. 2C). The biasing force produced by the biasing member 208 may force the SIM tray ejector arm against a contact surface of the SIM tray assembly 200, thereby increasing the resistance of the SIM tray ejector arm to motion (e.g., increasing the friction force that must be overcome in order to move the SIM tray ejector arm). The increased resistance to motion provided by the biasing member 208 may help prevent or reduce unintended motion of the SIM tray ejector arm during haptic outputs or other movements of the device 100. In some cases, other biasing members may be used instead of or in addition to the biasing member 208 to produce a biasing force that increases the friction force between the SIM tray ejector arm and a contact surface of the SIM tray assembly 200.

Figure 2B:
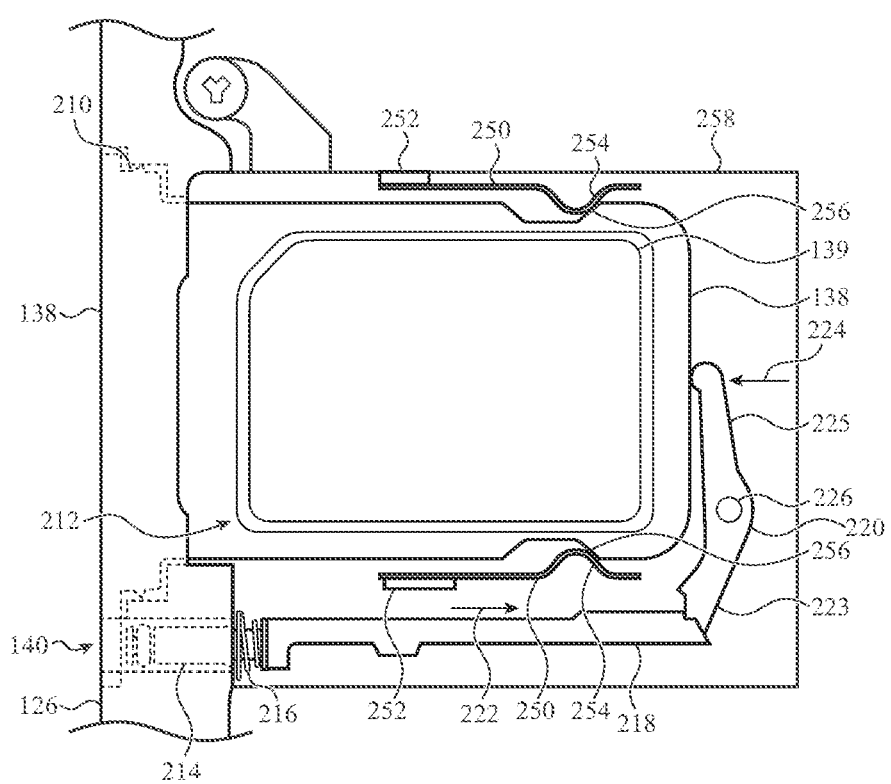
FIGS. 2B-2D depict a SIM tray assembly of the device of FIGS. 1A-1B.
Figure 2C:
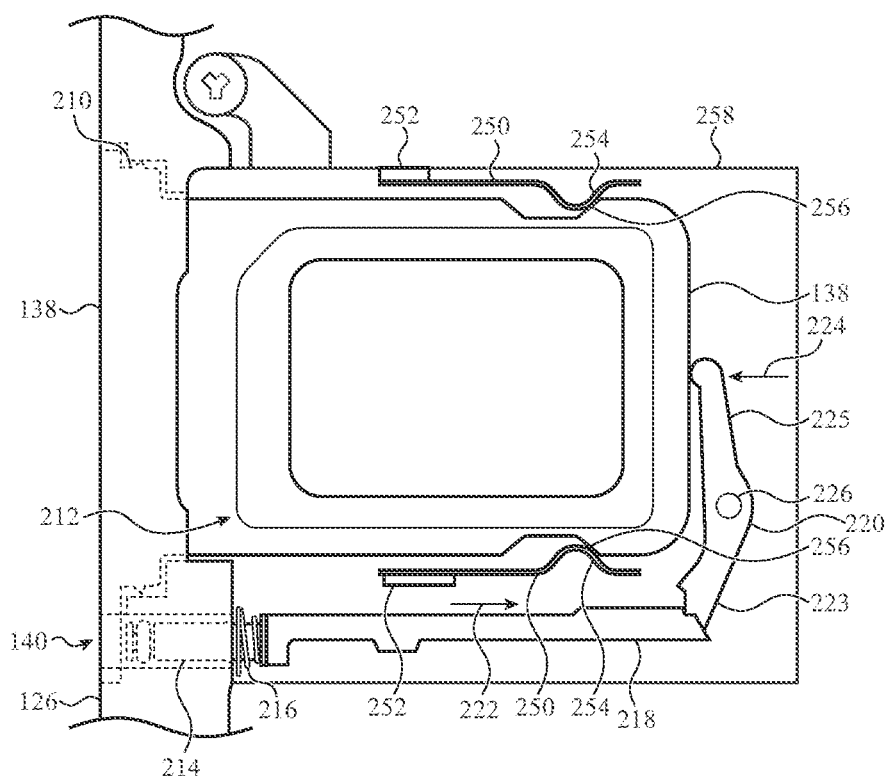
Figure 2D:
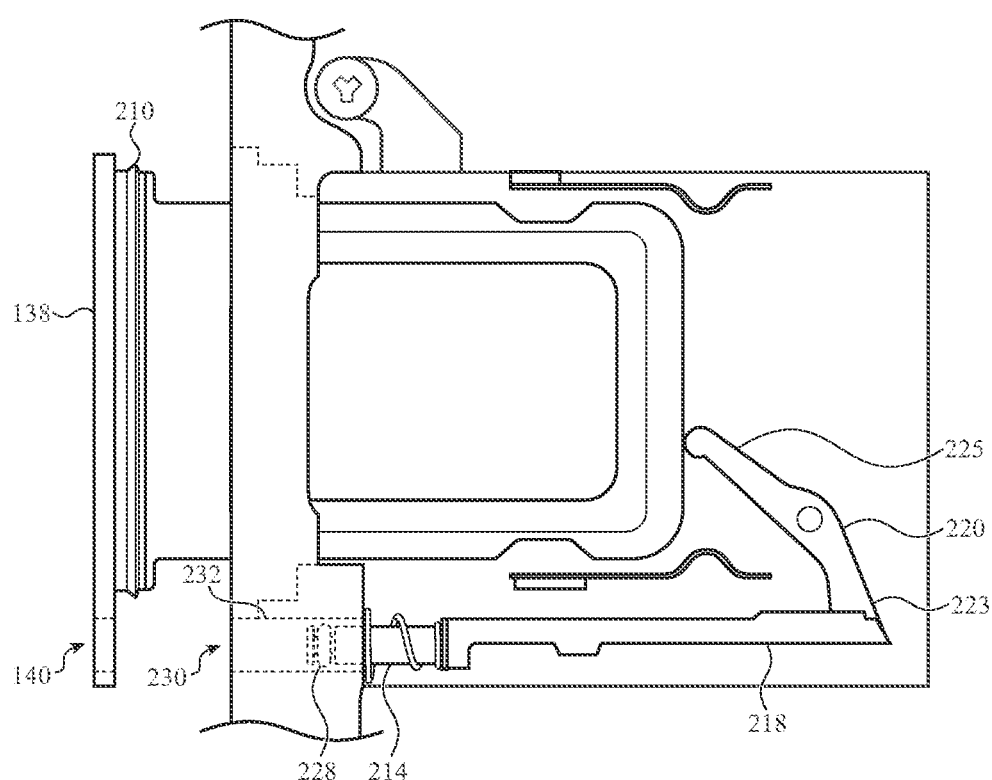

FIG. 2B illustrates the SIM tray assembly 200 with the cover member 206 removed, and with a SIM card 139 installed in the SIM tray 138. FIG. 2B illustrates the SIM tray 138 in the seated position in the device 100. The SIM tray 138 includes a SIM card carrier portion 212 (FIG. 2C) on which the SIM card 139 may be positioned. When the SIM card 139 is on the SIM card carrier portion 212 and the SIM tray 138 is in the seated position (as depicted in FIG. 2B), electrical contacts of the SIM tray assembly 200 (and/or the device 100) may be in contact with electrical terminals of the SIM card 139, thereby allowing the device 100 to read or otherwise receive information and/or data from the SIM card.

FIG. 2C illustrates the SIM tray assembly 200 with the cover member 206 removed, with the SIM tray 138 in the seated position in the device 100. The SIM tray 138 may include a sealing member 210. When the SIM tray 138 is in the seated position, as shown, the sealing member 210 (which may be a polymer material, such as an elastomer, that is coupled and/or retained to the SIM tray 138) may contact a side wall of a hole that is defined through the housing member 126. The sealing member 210 may prevent or reduce the likelihood of water or other liquids or debris from entering into the device 100 via the SIM tray hole in the housing member 126. The sealing member 210 may also provide a retention force that helps maintain the SIM tray 138 in the seated position. For example, the friction between the sealing member 210 and the housing member 126 (e.g., the surface of the hole) may help prevent accidental ejection or removal of the SIM tray 138.

The SIM tray assembly 200 also includes a SIM tray retaining mechanism configured to retain the SIM tray 138 in the seated position (e.g., so that the SIM card remains electrically and/or communicatively coupled to the device 100). In the example shown in FIG. 2C, the SIM tray retaining mechanism includes spring members 250. The spring members 250 may be attached to mounting features 252, which may be part of or attached to a frame member 258. The frame member 258 may define or include side walls that extend along one or more sides of a SIM tray assembly, as well as a bottom wall or structure (e.g., below the SIM tray 138, and to which one or both of the mounting features 252 may be coupled). The spring members 250 define retention features 254 that contact retention surfaces 256 of the SIM tray 138. When the SIM tray 138 is in the seated position, the spring members 250 (and more particularly, the retention features 254) impart a retention force on the SIM tray 138. The retention force imparted by the spring members 250 opposes and/or resists the biasing force imparted on the SIM tray 138 by the SIM tray ejection mechanism. For example, the retention force (e.g., the maximum retention force that the spring members 250 impart on the SIM tray 138) may be greater than the biasing force, or otherwise configured such that the biasing force does not overcome the retention force and eject the SIM tray 138. The retention features 254 and retention surfaces 256 are shaped so that the retention force can be overcome by the SIM tray ejection mechanism to eject the SIM tray 138. For example, an ejection force applied to the SIM tray 138 causes the retention surfaces 256 to push against the retention features 254, thereby deflecting the spring members 250 outward (e.g., away from the SIM tray 138) and allowing the SIM tray 138 to be at least partially ejected from the device 100.

The SIM tray ejection mechanism may include an ejector plug 214, a push rod 218, and a SIM tray ejector arm 220 (also referred to as a tray ejector arm or simply an ejector arm). The ejector plug 214, push rod 218, and tray ejector arm 220 may cooperate to at least partially eject the SIM tray 138 in response to a particular user actuation. For example, a user may apply an actuation force (e.g., indicated by arrow 222) to the ejector plug 214 using an ejector tool. The ejector tool may resemble a rod, pin, shaft, or other implement that can impart a suitable force on the ejector plug 214. The actuation force may be an axial force (e.g., parallel to or along a central axis of the ejector plug 214) along a left-to-right direction as depicted in FIG. 2C. In some cases, the ejector plug 214 is positioned in a hole formed through the housing member 126, and the actuation force may be applied to the ejector plug 214 by inserting the ejector tool into the hole, thereby contacting an end surface of the ejector plug 214.

The ejector plug 214 is configured to receive the actuation force from the ejector tool and impart or exert the actuation force on the push rod 218. For example, the ejector plug 214 (e.g., a second end surface of the ejector plug 214 opposite a first end surface, where the first end surface is facing outward configured to receive the ejector tool) may contact or otherwise be coupled to the push rod 218. When the actuation force is exerted on the ejector plug 214, the actuation force is transferred and/or imparted to the push rod 218. The ejector plug 214 may be formed of or comprise metal (e.g., aluminum, steel, titanium, etc.), and may include a coating, such as a plasma vapor deposition (PVD) coating, a chemical vapor deposition (CVD) coating, or the like, which may improve corrosion resistance, abrasion resistance, or the like, of the ejector plug 214. In some cases, the coating has a same color and/or surface finish (e.g., texture, roughness, etc.) as the housing 104.

The push rod 218 is configured to impart or exert the actuation force (received from the ejector plug 214) on the ejector arm 220. The ejector arm 220 defines a pivot member 226 (which defines a pivot axis extending normal to the page, as shown in FIG. 2C), a first portion 223 extending from the pivot member 226 along a first direction, and a second portion 225 extending from the pivot member along a second direction that is different than the first direction. The pivoting action of the ejector arm 220 changes the direction of the actuation force to impart an ejection force on the SIM tray 138. More particularly, the push rod 218 imparts the actuation force onto the first portion 223 of the ejector arm 220, causing the ejector arm 220 to pivot about the pivot member 226 (and thus about the pivot axis defined by the pivot member 226). The pivoting action causes the second portion 225 of the ejector arm 220 to impart an ejection force (indicated by arrow 224) onto the SIM tray 138. The ejection force acts in a different direction than the actuation force. For example, the ejection force may act in an opposite direction (e.g., arrow 224) than the actuation force (e.g., arrow 222), or at least include a force component in a direction opposite the actuation force, thereby at least partially ejecting the SIM tray 138 (e.g., pushing it out of the seated position) along a direction that is opposite the actuation force. The direction of the ejection force need not be exactly parallel to or opposite the actuation force to cause the SIM tray 138 to be ejected along a direction opposite the direction of the actuation force (e.g., the SIM tray 138 may be ejected along the direction opposite that of the actuation force as long as the ejection force includes a force component that is opposite that of the actuation force). In such cases, the SIM tray assembly 200 includes guides (e.g., rails, guide surfaces, channels, or other components or features) that guide the SIM tray 138 along the ejection direction (e.g., opposite the actuation force and optionally perpendicular to the side surface of the device 100) in response to the ejection force being imparted or otherwise applied to the SIM tray 138.

In some cases, the SIM tray assembly may include more or fewer components to transfer forces between an input member (e.g., the ejector plug) and the SIM tray 138. For example, in some cases, the ejector plug 214 is omitted, and a single push rod or other suitable member directly receives an actuation force from an ejector tool and engages the tray ejector arm 220. In other cases, the SIM tray assembly may include additional components, such as an interfacing component between the ejector plug 214 and the push rod 218.

The SIM tray assembly 200 also includes a biasing member 216 configured to bias the tray ejector arm 220 against the SIM tray 138. For example, the biasing member 216 imparts a force (e.g., a biasing force) acting in the same direction as the actuation force (e.g., indicated by the arrow 222) onto the push rod 218, which in turn imparts the biasing force (e.g., indicated by arrow 224) onto the tray ejector arm 220 via the first portion 223 of the tray ejector arm 220 when the SIM tray 138 is in the seated position. Stated another way, the biasing member 216 ultimately results in the second portion 225 of the tray ejector arm 220 being biased against the SIM tray 138 when the SIM tray 138 is in the seated position, as shown in FIG. 2C. The biasing force in the SIM tray ejection mechanism may help reduce or eliminate gaps between components and maintain the components in intimate contact with one another. The biasing force may further help ensure that the components cannot freely move relative to one another (e.g., during haptic outputs). Instead, the biasing force may hold the components together such that external forces that are experienced by the SIM tray ejection mechanism (e.g., from haptic outputs or other device motions) do not cause the components to rattle against each other (or otherwise come in and out of contact with one another).

In some cases, the biasing force produced by the biasing member 216 biases multiple components together and maintains them in intimate contact. For example, the biasing member 216 may bias the ejector plug 214 against the push rod 218, bias the push rod 218 against the first portion 223 of the tray ejector arm 220, and bias the second portion 225 of the tray ejector arm 220 against the SIM tray 138. Thus, the biasing member 216 may provide biasing forces to reduce slack and/or backlash in the mechanical components of the SIM tray assembly 200.

As noted above, the SIM tray ejection mechanism is configured to displace the SIM tray 138 in an outward direction, from a seated position to an at least partially ejected position. As noted above, FIG. 2C shows the SIM tray assembly 200 when the SIM tray 138 is in a seated position. FIG. 2D shows the SIM tray 138 in an at least partially ejected position. For example, an ejector tool inserted through the hole 140 in the SIM tray 138, into a hole 230 defined through the housing member, and against the ejector plug 214, thereby applying an actuation force to the ejector plug 214 that is transferred to the push rod 218 and the tray ejector arm 220 (which ultimately produces the ejection force to the SIM tray 138. The ejection force ultimately overcomes the retention force applied by the SIM tray retaining mechanism (as well as other forces that oppose the ejection force, such as frictional forces between the sealing member 210 and a side wall of the hole through which the SIM tray 138 extends, as well as friction elsewhere in the system), thereby causing the SIM tray 138 to be at least partially ejected (e.g., moved from its seated position, shown in FIG. 2C, to the partially ejected position shown in FIG. 2D). In some implementations, when the SIM tray 138 is at least partially ejected, as shown in FIG. 2D, the biasing member 216 is no longer in contact with the inside surface of the housing member 126, and therefor is no longer providing a biasing force to the mechanism.

Figure 3A:
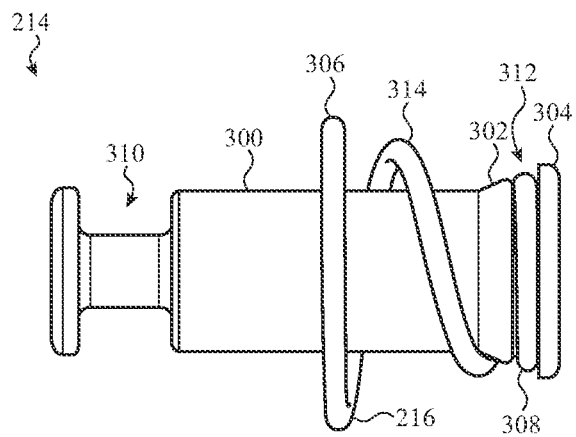
FIG. 3A depicts an example ejector plug and biasing member of a SIM tray assembly.

FIG. 3A illustrates the ejector plug 214 and the biasing member 216. The ejector plug 214 includes a shaft portion 300, a first channel 310 and a second channel 312. The first channel 310 is configured to receive a sealing member 228 that is configured to contact the ejector plug 214 (e.g., in the first channel 310) and a side wall 232 of the hole 230 defined through the housing member 126, as shown in FIG. 2D. The sealing member 228 (which may be a polymer material, such as an elastomer) may prevent or reduce the likelihood of water or other liquids or debris from entering into the device 100 via the hole 230 through the housing member 126. The sealing member 228 may be an o-ring. In some cases, the sealing member 228 is molded to the ejector plug 214 (e.g., it is bonded, adhered, and/or otherwise secured to the ejector plug 214).

The second channel 312 may be defined by a ramp portion 302 and a cap portion 304 of the ejector plug 214. The second channel 312 is configured to receive and retain a portion of the biasing member 216 (which is a conical coil spring in this example). For example, a first end coil 308 (which may be a coil of the biasing member 216 with a smallest diameter) may be received in the second channel 312, such that the first end coil 308 is captured between the ramp portion 302 and the cap portion 304. In some cases, the ramp portion 302 facilitates the installation of the biasing member 216 on the ejector plug 214. For example, the ejector plug 214 may be inserted through the first end coil 308 so that the first end coil 308 slides over the ramp portion 302 and into the second channel 312 (which may include the first end coil 308 expanding as it slides over the ramp portion 302 and retracting when it passes the ramp portion 302). In some cases, the largest diameter of the cap portion 304 is greater than the largest diameter of the ramp portion 302 to aid in the retention of the first end coil 308 in the second channel 312 and prevent the first end coil 308 from sliding over the cap portion 304 during assembly of the biasing member to the ejector plug 214. In some cases, the length of the ramp portion 302 (e.g., left-to-right, as shown in FIG. 3A) is less than or equal to the stack height of the biasing member 216 when the biasing member 216 (e.g., the spring) is fully compressed. In such cases, the ramp portion 302 does not contact the housing member 126 when the biasing member 216 is fully compressed.

The biasing member 216 shown in FIG. 3A is a conical coil spring. The spring defines a first end coil 308 (which may be a portion of the spring with a smallest diameter), a second end coil 306 (which may be a portion of the spring with a largest diameter), and one or more intermediate coils 314 between the first end coil 308 and the second end coil 306. The biasing member 216 is configured to produce a biasing force by pushing the ejector plug 214 inwards, along the same direction of an actuation force that ejects the SIM tray 138. For example, the second end coil 306 may contact an interior surface of the housing member 126 (or another structure, member, or component of the device 100). When the SIM tray 138 is in the seated position, the biasing member 216 may be at least partially compressed, thereby producing the biasing force.

Figure 3B:
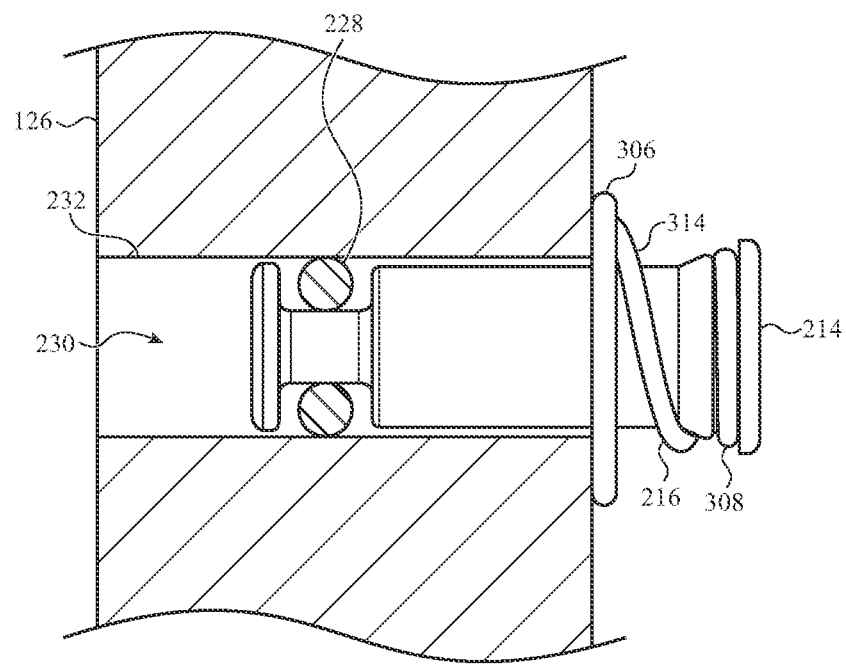
FIG. 3B depicts the ejector plug and biasing member of FIG. 3A in a housing member.

FIG. 3B illustrates the ejector plug 214 and the biasing member 216 in a configuration or position that corresponds to the SIM tray 138 being in a seated position. As shown, the ejector plug 214 is positioned at least partially in the hole 230, and the sealing member 228 is in contact with the side wall 232 of the hole 230. For clarity, the housing member 126 and the sealing member 210 are shown in cross-section (e.g., viewed along line 3B-3B in FIG. 1B). The second end coil 306 of the biasing member 216 is seated against a surface of the housing member 126, and the biasing member 216 is at least partially compressed. In the at least partially compressed state, at least a portion of an intermediate coil 314 is coiled inside the second end coil 306. More particularly, the conical shape of the conical spring biasing member allows at least some of the intermediate coils 314 to nest inside the second end coil 306. In this way, the conical spring may compress to a smaller minimum length than a non-conical coil spring and/or other types of biasing members.

In cases where the biasing member 216 is a conical coil spring, the spring may be formed of wire having a diameter of between about 0.10 mm and about 0.20 mm, or between about 0.15 mm and about 0.18 mm. The material of the conical coil spring may be any suitable material, such as stainless steel, spring steel, titanium, etc. In some cases, the conical coil spring has a coating, such as a plasma vapor deposition (PVD) coating, chemical vapor deposition (CVD) coating, or the like. Such coatings may impart certain properties to the coil spring, such as corrosion resistance, abrasion resistance, or the like. The length of the conical coil spring in an uncompressed state (e.g., left-to-right as shown in FIG. 3A) may be between about 1.0 and about 2.0 mm, or between about 1.4 and about 1.8 mm. The spring stroke may be between about 0.5 and about 1.0 mm.

The biasing force produced by the biasing member 216 may be sufficient to maintain components of the SIM tray ejection mechanism in contact with one another during haptic outputs or other motion events, but lower than a retention force that is imparted on the SIM tray 138 by the SIM tray retaining mechanism and any additional retention forces in the assembly (e.g., frictional forces due to the sealing member 210, FIG. 2C). In some cases, the biasing member 216 produces a biasing force between about 0.8 N and about 1.5 N. In some cases, the biasing member 216 produces a biasing force that is less than about 1.5 N.

While FIGS. 2A-3B illustrate the biasing member 216 as a conical coil spring, other types of biasing members may be used instead of or in addition to a conical coil spring. For example, a cylindrical coil spring, an elastomer material, a leaf spring, or any other suitable component or material may be used instead of or in addition to a conical coil spring.

Figure 4A:
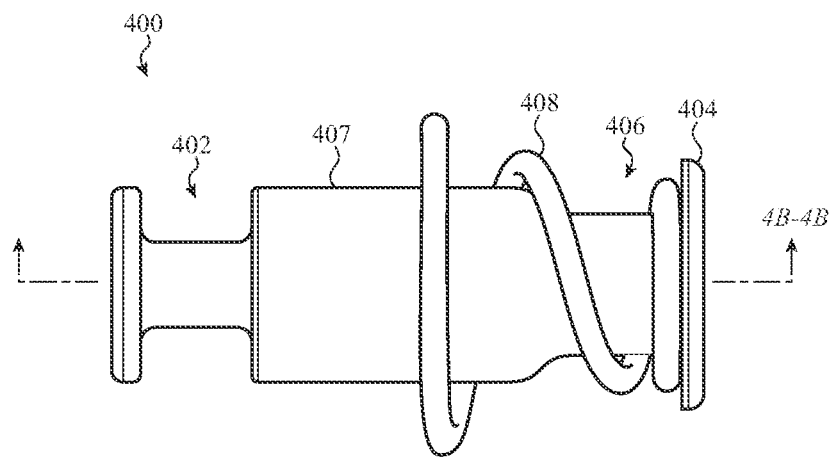
FIG. 4A depicts an example ejector plug for use in a SIM tray assembly.

FIGS. 2A-3B illustrate an example biasing member and ejector plug that may be used to impart a biasing force to the components of the SIM tray assembly 200. In some cases, different biasing members and ejector plugs may be used instead of or in addition to those shown in FIGS. 2A-3B. FIG. 4A, for example, illustrates another example ejector plug 400 and biasing member 408. The ejector plug 400 defines a first channel 402 and a second channel 406. The first channel 402 is configured to receive a sealing member (e.g., the sealing member 228) that is configured to contact the ejector plug 400 (e.g., in the first channel 402) and a side wall 232 of the hole 230 defined through the housing member 126, as shown in FIG. 2D. As noted above, the sealing member 228 may be an o-ring, a sealing member that is molded to the ejector plug 400, or another suitable component and/or material.

The second channel 406 may be configured to receive and retain a portion of the biasing member 408 therein. Whereas the second channel 312 in FIG. 3A is defined by a ramp portion 302, which has a diameter larger than a shaft portion 300 of the ejector plug 214, the second channel 406 lacks the ramp portion, and the second channel 406 is at least partially defined by a region having a smaller diameter than a shaft portion 407 of the ejector plug 400. The second channel 406 may be further defined by a cap portion 404, which may have a diameter that is larger than the second channel 406, and optionally larger than the shaft portion 407.

The biasing member 408 is a conical coil spring (which may have the same and/or similar materials and properties as the conical coil spring biasing member 216 described above), though other types of biasing members may be used instead of or in addition to a conical spring, such as a cylindrical coil spring, an elastomer material, a leaf spring, or any other suitable component or material.

Figure 4B:
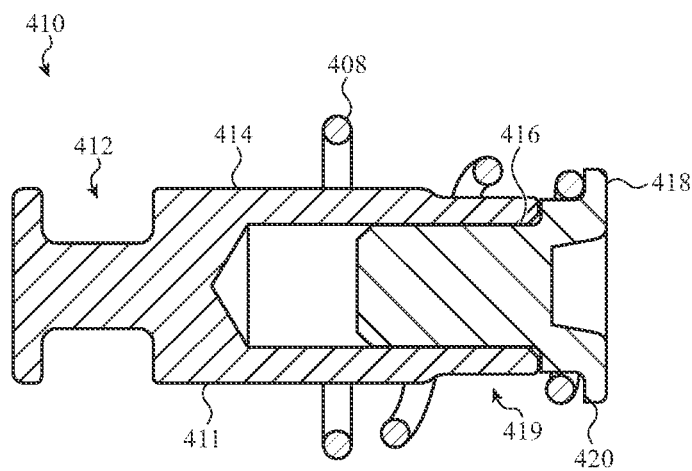
FIG. 4B depicts another example ejector plug for use in a SIM tray assembly.

The ejector plug 400 may be a single unitary component (e.g., a monolithic metal structure), or it may be an assembly. FIG. 4B illustrates a cross-sectional view of an example ejector plug 410 having a similar outer shape as the ejector plug 400, but formed of a multi-part assembly. The cross-sectional view corresponds to a view along line 4B-4B in FIG. 4A, though the cross-section in FIG. 4B does not necessarily correspond exactly to the ejector plug 400. In particular, the ejector plug 410 includes a body member 411 defining a first channel 412 (e.g., for retaining a sealing member such as an o-ring), a shaft portion 414, and at least a first portion of a second channel 419 (e.g., for retaining a portion of the biasing member 408). The ejector plug 410 may also include a cap member 418 that is fastened to the body member 411 (e.g., via a threaded hole 416 in the body member 411). The cap member 418 may define a flange 420 that defines a second portion of the second channel 419. The flange 420 may have a larger diameter than the second channel 419, thus retaining the biasing member 408 in the second channel, as shown in FIG. 4B. In some cases, the cap member 418 is a screw. The two-part ejector plug 410 may facilitate the attachment of the biasing member 408 by allowing the biasing member 408 to be attached to the ejector plug 410 without having to deform the biasing member 408 to position it in the second channel of the ejector plug (e.g., without having to push the biasing member over a ramp portion or shaft portion that has a larger diameter than the inner diameter of the narrow end of the coil spring).

Figure 5A:
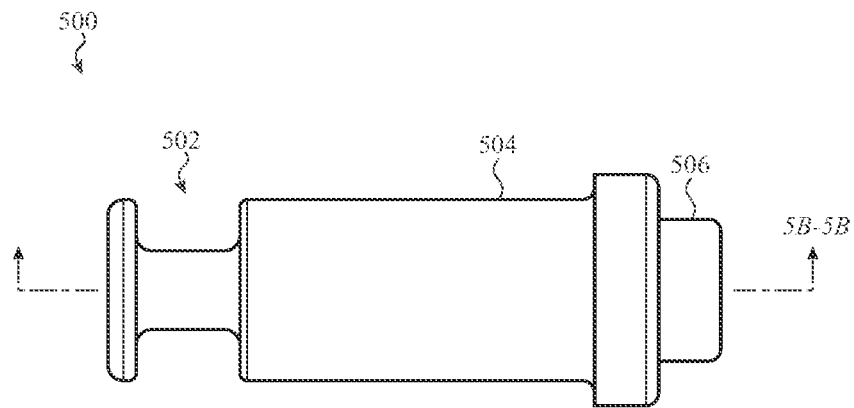
FIGS. 5A-5B depict another example ejector plug for use in a SIM tray assembly.
Figure 5B:
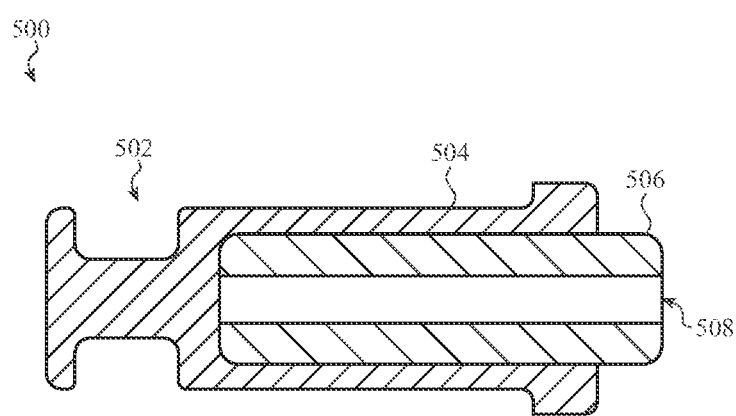

FIGS. 5A-5B illustrate an example ejector plug 500 with an elastomer biasing member 506 Like the other ejector plugs described herein, the ejector plug 500 includes a channel portion 502 (for receiving and retaining an o-ring or other sealing member) and a shaft portion 504. The biasing member 506 extends from an end of the ejector plug and is configured to engage with a push rod (e.g., the push rod 218), or other member or component of the SIM tray ejection mechanism, to impart a biasing force on the push rod (or other member/component). The biasing force may be produced by compressing the biasing member 506 between the ejector plug 500 and the push rod (or other member/component) so that the biasing member 506 is imparting a biasing force when the SIM tray is in a seated position. When the ejector plug 500 is actuated (e.g., an actuation force is applied to an end of the ejector plug 500), the actuation force is imparted to the push rod (or other member/component) through the biasing member 506. During actuation, the actuation force may further compress the biasing member 506 (e.g., beyond the degree to which it is compressed when the SIM tray is in the seated position to produce the biasing force), but the elastomer material of the biasing member 506 may remain stiff enough to transfer the actuation force to the push rod (or other member/component). In some cases, when the actuation force is applied, the biasing member 506 may be compressed sufficiently that the ejector plug 500 itself contacts the push rod (or other member/component) such that the actuation force is applied directly via contact between the ejector plug 500 and the push rod (or other member/component).

FIG. 5B is a cross-sectional view of the ejector plug 500 and biasing member 506, viewed along line 5B-5B in FIG. 5A. The biasing member 506 may be positioned in a blind hole defined in the ejector plug 500 (and may optionally be adhered to or otherwise bonded to the ejector plug 500 in the blind hole). The biasing member 506 may define a hole 508 extending fully (as shown) or partially through the biasing member 506 (e.g., along a central axis such that the biasing member 506 has a hollow cylindrical shape). The size, shape, and materials of the biasing member 506 may be selected to produce a desired biasing force and/or spring rate from the biasing member 506. For example, factors such as the length of the biasing member 506 (e.g., from left-to-right as shown in FIG. 5B), the outer dimeter of the biasing member 506, the inner diameter of the axial hole in the biasing member 506, the durometer, hardness, or other material property of the biasing member 506, and/or the amount of the biasing member 506 that is inside the ejector plug 500 and outside the ejector plug 500, may be selected to produce the desired biasing force or other properties of the biasing member 506.

Figure 6:
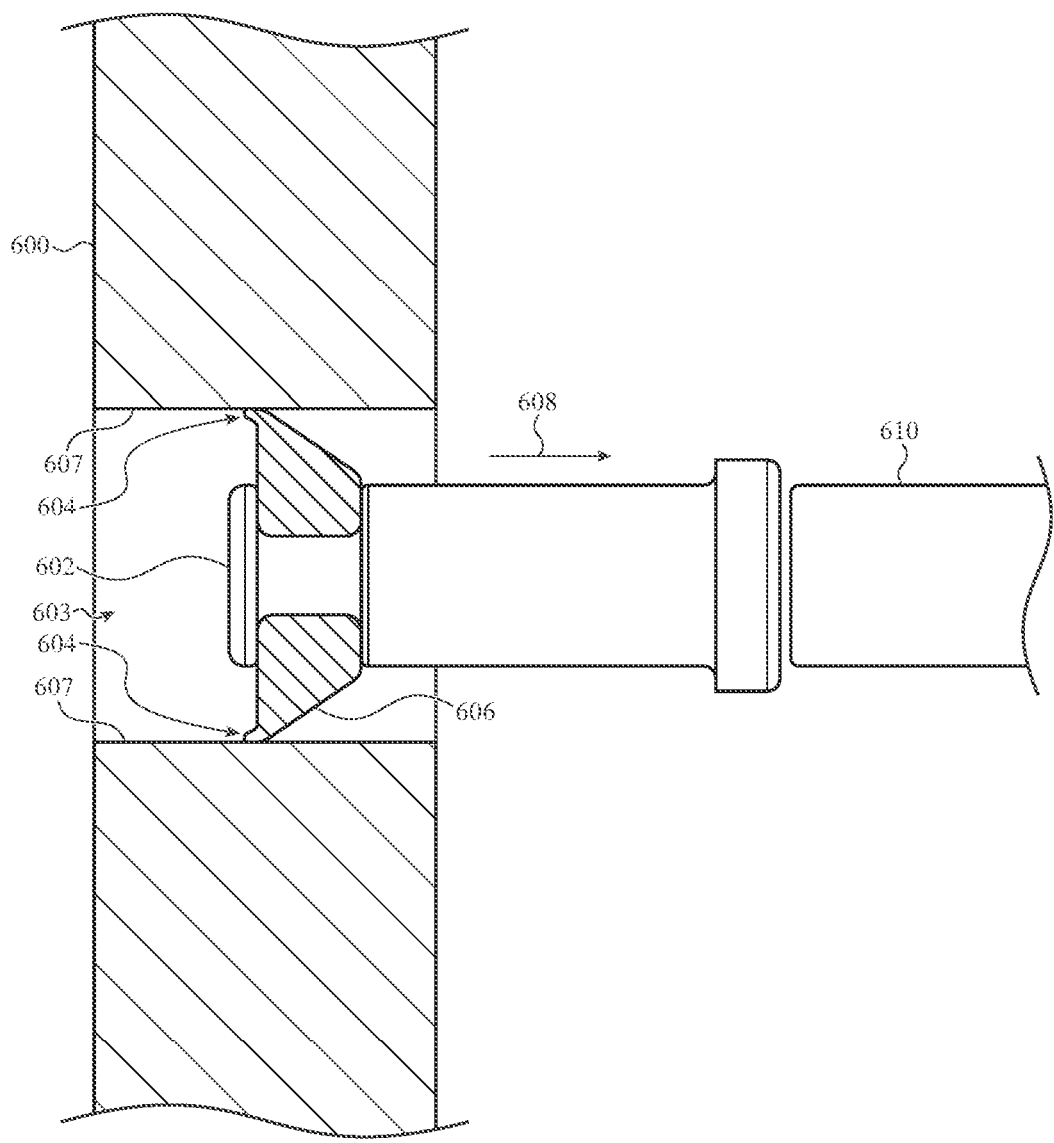
FIG. 6 depicts another example ejector plug and biasing member for use in a SIM tray assembly.

FIG. 6 illustrates a portion of another example configuration for producing a biasing force in a SIM tray assembly. In particular, FIG. 6 shows an ejector plug 602 in a hole 603 formed through a housing member 600 (which may be an embodiment of and/or correspond to the housing member 126 and the hole 230 in FIG. 2D). The ejector plug 602 is configured to impart an actuation force on a push rod 610, which may an embodiment of and/or correspond to the push rod 218, to at least partially eject a SIM tray. A compliant member 606 may be coupled to the ejector plug 602 and configured to contact (and deform against) a side wall 607 that defines the hole 603. The deformation of the compliant member 606 against the side wall 607 seals the hole 603 from ingress of liquids and/or other contaminants, and also imparts a biasing force on the ejector plug 602 (and thus on the push rod 610). For example, the interaction of the angled or chisel-shaped edge of the compliant member 606 against the side wall 607 causes the ejector plug 602 to be biased towards the interior of the device (as indicated by the arrow 608). FIG. 6 shows an edge 604 of the compliant member 606 deformed due to the contact with the side wall 607. Thus, once the ejector plug 602 is positioned in a particular position in the hole 603 (e.g., when the SIM tray is inserted into the device and into the seated position), the compliant member 606 will tend to force or bias the ejector plug 602 along the direction indicated by arrow 608.

The size, shape, and materials of the compliant member 606 may be selected to produce a desired biasing force from the compliant member 606. For example, factors such as the outer dimeter of the compliant member 606, the durometer, hardness, or other material property of the compliant member 606, and/or the angle of the angled surface of the compliant member 606, may be selected to produce the desired biasing force or other properties of the compliant member 606.

The compliant member 606 may be attached to the ejector plug 602 via an insert mold process whereby the ejector plug 602 is placed in a mold and a curable material (e.g., an elastomeric polymer) is injected into the mold and against the ejector plug 602 (e.g., in a channel of the ejector plug 602). The curable material is allowed to cure or harden to form the compliant member 606. The molding process may adhere or otherwise bond the compliant member 606 to the ejector plug 602. In some cases, the compliant member 606 is formed separately from the ejector plug 602 and attached, bonded, adhered, or otherwise coupled to the ejector plug 602.

In some cases, as described above, biasing members may be used to impart a biasing force to a SIM tray ejection mechanism to eliminate slack, gaps, and/or backlash in the mechanism. In some cases, instead of or in addition to such biasing forces, additional biasing forces may be imparted to components of a SIM tray ejection mechanism to increase the frictional forces between components, thereby reducing unintended motion of the devices.

Figure 7A:
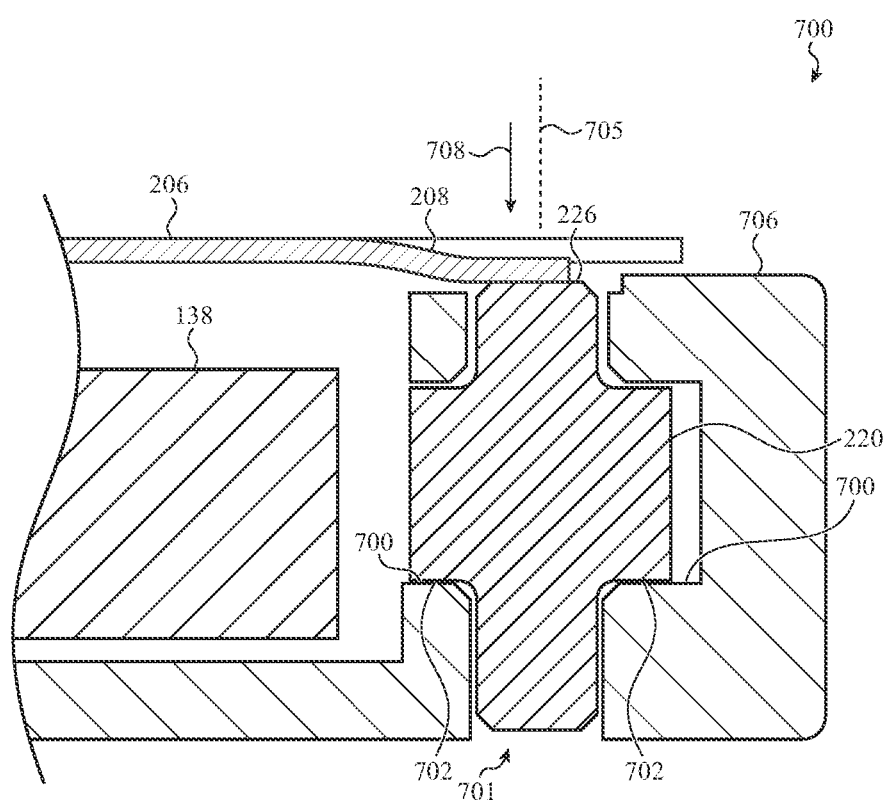
FIG. 7A depicts a partial cross-sectional view of the SIM tray assembly of the device of FIGS. 1A-1B.

FIG. 7A is a partial cross-sectional view of the SIM tray assembly 200, viewed along line 7-7 in FIG. 2A, illustrating an example biasing member 208 (shown in FIG. 7A as a beam spring) that is configured to increase the frictional forces on the tray ejector arm 220 to help reduce unwanted motion of the tray ejector arm 220. For example, as noted above, the tray ejector arm 220 is configured to pivot about a pivot axis 705 defined by a pivot member 226 (e.g., a vertical axis through a center of the pivot member 226, as shown in FIG. 7A). The pivot member 226 may extend into an opening 701 in a structure 706 (which may correspond to the frame member 258 or another structure of the SIM tray assembly 200 or device 100). The tray ejector arm 220 further defines a first contact surface 702 that contacts a second contact surface 700 defined by the structure 706. When the tray ejector arm 220 pivots about the pivot axis 705, the first contact surface 702 slides along the second contact surface 700 (e.g., in a rotating motion). Accordingly, the biasing force imparted by the biasing member 208 increases the normal force between the first and second contact surfaces, thereby increasing the frictional force between the SIM tray ejector arm 220 and the structure 706 and increasing the amount of force necessary to cause the SIM tray ejector arm 220 to move relative to the structure 706. The magnitude of the biasing force may be such that the SIM tray ejector arm 220 does not move freely during haptic outputs (e.g., the vibration of a haptic output does not cause the SIM tray ejector arm 220 to pivot), but an actuation force applied by a user to eject the SIM tray 138 can overcome the frictional forces to allow the SIM tray ejector arm 220 to at least partially eject the SIM tray 138.

The biasing member 208 is configured to impart a biasing force on the SIM tray ejector arm 220, where the biasing force acts along a direction indicated by the arrow 708 (e.g., parallel to and optionally coincident with the pivot axis 705). The biasing force imparted by the biasing member 208 is along a different direction than that imparted by the biasing members described with respect to FIGS. 2A-6. For example, while the biasing force imparted by the biasing members in FIGS. 2A-6 act along a direction that is in-plane with the display 103 and/or cover 102, the biasing force imparted by the biasing member 208 acts along a direction that is substantially perpendicular to the plane of the display 103 and/or cover 102.

The biasing member 208 may be a beam spring that contacts a top surface of the tray ejector arm 220, as shown in FIG. 7A. In some cases, the biasing member 208 is a beam spring that is integrally formed with the cover member 206. For example, the biasing member 208 may be formed by cutting or otherwise forming one or more openings through the cover member 206 to define a cantilevered beam (as shown in FIG. 2A, for example), and then deforming or deflecting the cantilevered beam so that it contacts and imparts a biasing force on the SIM tray ejector arm 220. In some cases, the biasing member 208 is a separate component from the cover member 206.

Figure 7B:
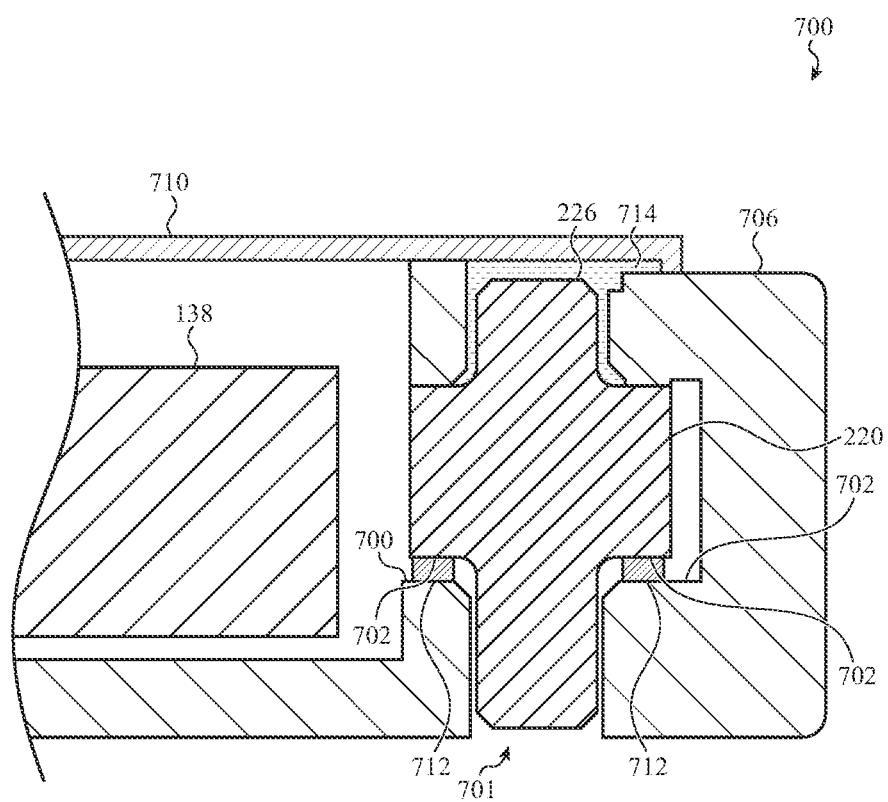
FIG. 7B depicts a partial cross-sectional view of another SIM tray assembly of the device of FIGS. 1A-1B.

Other biasing members may be used in addition to or instead of the beam spring shown in FIG. 7A. For example, FIG. 7B illustrates another example SIM tray assembly in which an optional biasing member 712 is positioned between the SIM tray ejector arm 220 (e.g., the contact surface 702 of the SIM tray ejector arm 220) and the contact surface 700 of the structure 706. The biasing member 712 may be, for example, a spring (e.g., a wave spring, a coil spring, a leaf spring, etc.), an elastomeric material (e.g., a rubber, foam, etc.), or the like. In some cases, the biasing member 712 is positioned between other surfaces or portions of the SIM tray ejector arm 220 and the structure 706. In some cases, the elastomeric material (or other suitable dampening material used as the biasing member 712) may dampen vibration and/or reduce the motion of components of the SIM tray assembly instead of or in addition to (and optionally as a result of) a biasing force produced by the elastomeric material.

FIG. 7B also illustrates an optional fluid 714 that may be positioned between a cover member 710 (which may be an embodiment of the cover member 206) and the SIM tray ejector arm 220. The fluid 714 may be captured between the cover member 710, the SIM tray ejector arm 220, and the structure 706. In some cases, the fluid 714 is in an opening in the structure 706 that receives a pivot member of the tray ejector arm 220.

The fluid 714 may be used to dampen vibrations and/or reduce the motion of components in response to applied vibrations and/or oscillations. The fluid 714 may be any suitable fluid, such as an oil, a silicone-based fluid, or the like. As another example, the fluid 714 may be a ferromagnetic fluid. In the case of a ferromagnetic fluid, the tray ejector arm (e.g., the tray ejector arm 220), the pivot member (e.g., the pivot member 226), the cover member 710, and/or the structure that receives and/or the pivot member (e.g., the structure 706) may be a magnet or include a magnet to attract and retain the ferromagnetic fluid in the space between the pivot member and the surface(s) of the structure(s) that receives and/or contacts the pivot member.

Figure 8:
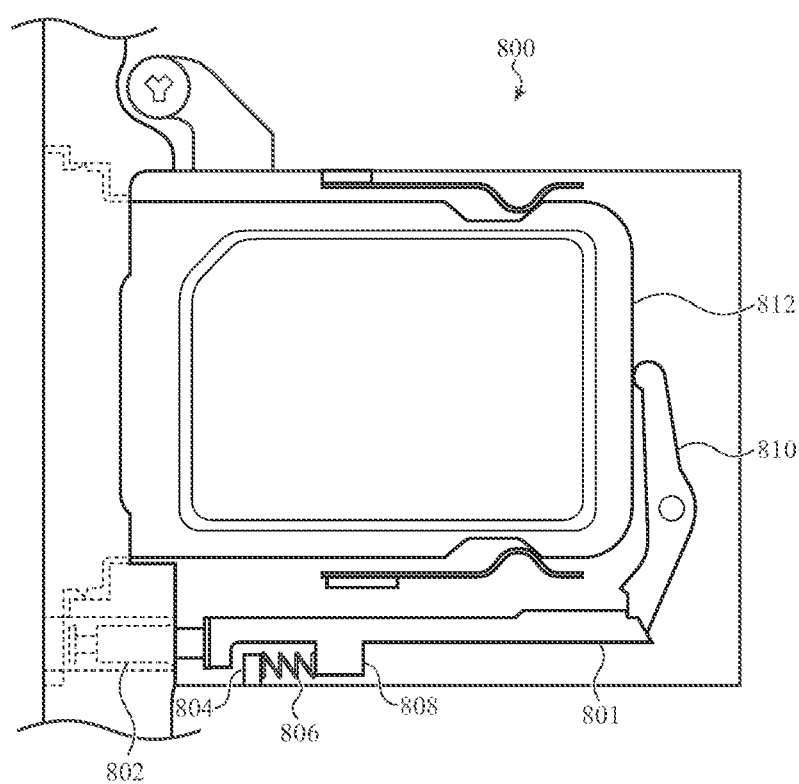
FIG. 8 depicts another example SIM tray assembly.

FIG. 8 illustrates another example SIM tray assembly 800 that uses a biasing member to impart a biasing force on the components of an ejection mechanism. For example, a biasing member 806 (shown as a coil spring, though other types of springs and/or compliant members may be used instead of or in addition to a coil spring) may be positioned between a support structure 804 and a feature 808 of a push rod 801. The biasing member 806 may be at least partially compressed when the SIM tray is in the seated position (as shown in FIG. 8), so that the biasing force is applied when the SIM tray is in the seated position. The biasing force imparted to the push rod 801 from the biasing member 806 may perform in a similar manner to the biasing members described above (e.g., the biasing members 216, 408, 506). In particular, the biasing force from the biasing member 806 forces the push rod 801 against the SIM tray ejector arm 810 (which may be the same as the SIM tray ejector arm 220), and ultimately forces the SIM tray ejector arm 810 against the SIM tray 812 (which may be the same as the SIM tray 138). The SIM tray assembly 800 may also include an ejector plug 802 in a hole formed through a housing member (which may be an embodiment of and/or correspond to the housing member 126 and the hole 230 in FIG. 2D). The ejector plug 802 is configured to impart an actuation force on the push rod 801 to at least partially eject the SIM tray 812.

Other example biasing members that may be used to impart a biasing force on the SIM tray (and/or other components in a SIM tray assembly) include, for example, a torsion spring coupled to the SIM tray ejector arm 220 (and to another structure such as a frame member) to bias the SIM tray ejector arm 220 against the SIM tray 138. As another example, pairs of repelling magnets may be placed on components that are to be biased away from each other (e.g., a pair of repelling magnets may be positioned on an end of the push rod 218 and the first portion 223 of the SIM tray ejector arm 220, or between the opposite end of the push rod 218 and the ejector plug 214. As yet another example, a spring may be positioned between the second portion 225 of the SIM tray ejector arm 220 and the frame member 258 to bias the SIM tray ejector arm 220 against the SIM tray 138. Other types of biasing members and corresponding structures and/or components are also contemplated.

In some cases, components of a SIM assembly (which may be metal or polymer materials), and especially surfaces of the components that contact other components, may be coated with polymer materials to help deaden or reduce the sound of the components contacting each other. This may further mitigate sounds due to the components impacting one another (e.g., due to vibrations from a haptic actuator).

Figure 9:
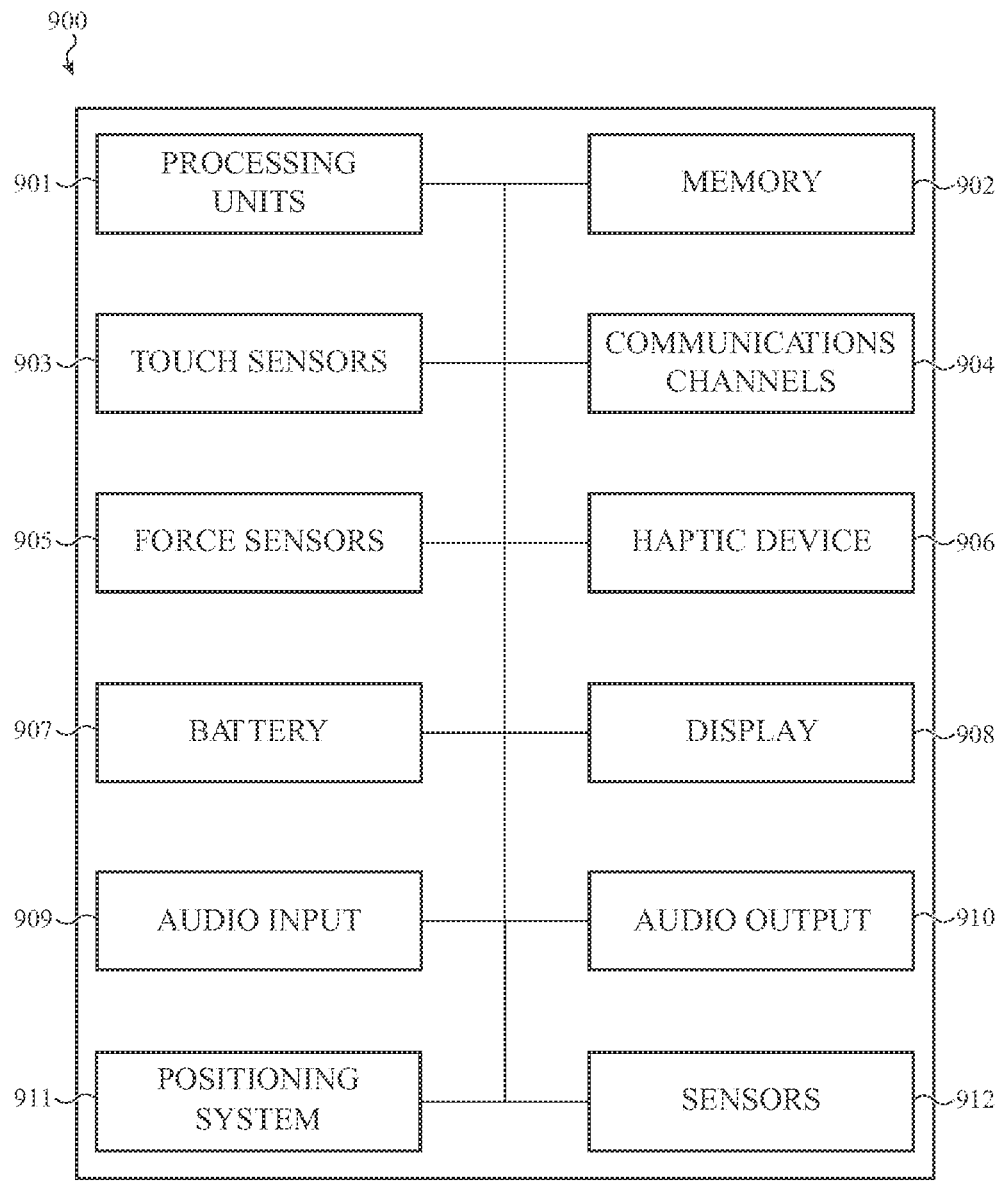
FIG. 9 depicts a schematic diagram of an example electronic device.

FIG. 9 depicts an example schematic diagram of an electronic device 900. The electronic device 900 may be an embodiment of or otherwise represent the device 100. The device 900 may represent a mobile phone, a tablet computer, a portable music player, a laptop computer, a virtual- or augmented-reality headset, a watch, or the like. The device 900 includes one or more processing units 901 that are configured to access a memory 902 having instructions stored thereon. The instructions or computer programs may be configured to perform one or more of the operations or functions described with respect to the electronic devices described herein. For example, the instructions may be configured to control or coordinate the operation of one or more displays 908, one or more touch sensors 903, one or more force sensors 905, one or more communications channels 904, one or more audio input systems 909, one or more audio output systems 910, one or more positioning systems 911, one or more sensors 912, and/or one or more haptic feedback devices 906 (e.g., haptic actuators).

The processing units 901 of FIG. 9 may be implemented as any electronic device capable of processing, receiving, or transmitting data or instructions. For example, the processing units 901 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 901 may be coupled to a logic board of the device 900.

The memory 902 can store electronic data that can be used by the device 900. For example, a memory can store electrical data or content such as, for example, audio and video files, images, documents and applications, device settings and user preferences, programs, instructions, timing and control signals or data for the various modules, data structures or databases, and so on. The memory 902 can be configured as any type of memory. By way of example only, the memory can be implemented as random access memory, read-only memory, Flash memory, removable memory, or other types of storage elements, or combinations of such devices. The memory 902 may be coupled to a logic board of the device 900.

The touch sensors 903 may detect various types of touch-based inputs and generate signals or data that are able to be accessed using processor instructions. The touch sensors 903 may use any suitable components and may rely on any suitable phenomena to detect physical inputs. For example, the touch sensors 903 may be capacitive touch sensors, resistive touch sensors, acoustic wave sensors, or the like. The touch sensors 903 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The touch sensors 903 may be integrated with or otherwise configured to detect touch inputs applied to any portion of the device 900. For example, the touch sensors 903 may be configured to detect touch inputs applied to any portion of the device 900 that includes a display (and may be integrated with a display). The touch sensors 903 may operate in conjunction with the force sensors 905 to generate signals or data in response to touch inputs. A touch sensor or force sensor that is positioned over a display surface or otherwise integrated with a display may be referred to herein as a touch-sensitive display, force-sensitive display, or touchscreen.

The force sensors 905 may detect various types of force-based inputs and generate signals or data that are able to be accessed using processor instructions. The force sensors 905 may use any suitable components and may rely on any suitable phenomena to detect physical inputs. For example, the force sensors 905 may be strain-based sensors, piezo-electric-based sensors, piezoresistive-based sensors, capacitive sensors, resistive sensors, or the like. The force sensors 905 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 905 may be used in conjunction with various input mechanisms to detect various types of inputs. For example, the force sensors 905 may be used to detect presses or other force inputs that satisfy a force threshold (which may represent a more forceful input than is typical for a standard "touch" input) Like the touch sensors 903, the force sensors 905 may be integrated with or otherwise configured to detect force inputs applied to any portion of the device 900. For example, the force sensors 905 may be configured to detect force inputs applied to any portion of the device 900 that includes a display (and may be integrated with a display). The force sensors 905 may operate in conjunction with the touch sensors 903 to generate signals or data in response to touch- and/or force-based inputs.

The device 900 may also include one or more haptic feedback devices 906 (also referred to as haptic actuators). The haptic feedback device 906 may include one or more of a variety of haptic technologies such as, but not necessarily limited to, rotational haptic devices, linear actuators, piezo-electric devices, vibration elements, and so on. In general, the haptic feedback device 906 may be configured to provide punctuated and distinct feedback to a user of the device. More particularly, the haptic feedback device 906 may be adapted to produce a knock or tap sensation and/or a vibration sensation. Such haptic outputs may be provided in response to detection of inputs such as touch and/or force inputs, or events such as a successful (or unsuccessful) biometric authentication. The haptic outputs may be imparted to a user through the exterior surface of the device 900 (e.g., via a glass or other surface that acts as a touch- and/or force-sensitive display or surface), or via an input member such as a button or biometric sensor.

The one or more communications channels 904 may include one or more wireless interface(s) that are adapted to provide communication between the processing unit(s) 901 and an external device. The one or more communication channels 904 may include antennas (e.g., antennas that include or use the housing members of the housing 104 as radiating members), communications circuitry, firmware, software, or any other components or systems that facilitate wireless communications with other devices. In general, the one or more communications channels 904 may be configured to transmit and receive data and/or signals that may be interpreted by instructions executed on the processing units 901. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communications channels 904 may also include ultra-wideband interfaces, which may include any appropriate communications circuitry, instructions, and number and position of suitable UWB antennas. The communications channels 904 may use, communicate with, and/or receive data from a SIM card. The SIM card (such as the SIM card 139 in FIG. 2B) may store (and provide to the device 900) information such as an integrated circuit card identifier (ICCID), international mobile subscriber identity (IMSI) number, security authentication and ciphering information, local network information, a personal identification number (PIN), a personal unblocking key (PUK), a serial SIM number (SSN), an international article number (IAN), a European article number (EAN), and/or other infomraiton.

As shown in FIG. 9, the device 900 may include a battery 907 that is used to store and provide power to the other components of the device 900. The battery 907 may be a rechargeable power supply that is configured to provide power to the device 900. The battery 907 may be coupled to charging systems (e.g., wired and/or wireless charging systems) and/or other circuitry to control the electrical power provided to the battery 907 and to control the electrical power provided from the battery 907 to the device 900.

The device 900 may also include one or more displays 908 configured to display graphical outputs. The displays 908 may use any suitable display technology, including liquid crystal displays (LCD), organic light emitting diodes (OLED) displays, active-matrix organic light-emitting diode displays (AMOLED), or the like. The displays 908 may display graphical user interfaces, images, icons, or any other suitable graphical outputs. The display 908 may correspond to the display 103 of FIG. 1A.

The device 900 may also provide audio input functionality via one or more audio input systems 909. The audio input systems 909 may include microphones, transducers, or other devices that capture sound for voice calls, video calls, audio recordings, video recordings, voice commands, and the like.

The device 900 may also provide audio output functionality via one or more audio output systems (e.g., speakers) 910. The audio output systems 910 may produce sound from voice calls, video calls, streaming or local audio content, streaming or local video content, or the like.

The device 900 may also include a positioning system 911. The positioning system 911 may be configured to determine the location of the device 900. For example, the positioning system 911 may include magnetometers, gyroscopes, accelerometers, optical sensors, cameras, global positioning system (GPS) receivers, inertial positioning systems, or the like. The positioning system 911 may be used to determine spatial parameters of the device 900, such as the location of the device 900 (e.g., geographical coordinates of the device), measurements or estimates of physical movement of the device 900, an orientation of the device 900, or the like.

The device 900 may also include one or more additional sensors 912 to receive inputs (e.g., from a user or another computer, device, system, network, etc.) or to detect any suitable property or parameter of the device, the environment surrounding the device, people or things interacting with the device (or nearby the device), or the like. For example, a device may include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 9 are disclosed as being part of, incorporated into, or performed by the device 900, it should be understood that various embodiments may omit any or all such described functionalities, operations, and structures. Thus, different embodiments of the device 900 may have some, none, or all of the various capabilities, apparatuses, physical features, modes, and operating parameters discussed herein. Further, the systems included in the device 900 are not exclusive, and the device 900 may include alternative or additional systems, components, modules, programs, instructions, or the like, that may be necessary or useful to perform the functions described herein.

As described above, one aspect of the present technology is the gathering and use of data available from various sources. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the figure being referred to, unless an absolute horizontal or vertical orientation is indicated.

What is claimed is:

1. A portable electronic device comprising:
   a housing member defining:
      at least a portion of an exterior side surface of the portable electronic device; and
      a first hole positioned along the exterior side surface and extending through the housing member; and
      a second hole positioned along the exterior side surface and extending through the housing member;
   a subscriber identity module (SIM) tray extending through the first hole and movable between a seated position and an at least partially ejected position;
   a tray ejector arm configured to at least partially eject the SIM tray from the portable electronic device in response to a user actuation;
   an ejector plug positioned in the second hole and configured to receive an actuation force;
   a push rod configured to transfer the actuation force from the ejector plug to the tray ejector arm; and
   a biasing spring coupled to the ejector plug and captured between the ejector plug and an interior surface of the housing member, the biasing spring configured to impart a biasing force on the tray ejector arm via the ejector plug and the push rod, thereby biasing the tray ejector arm against the SIM tray when the SIM tray is in the seated position.

2. The portable electronic device of claim 1, wherein:
   the portable electronic device further includes a SIM tray retaining mechanism configured to retain the SIM tray in the seated position; and
   the SIM tray retaining mechanism imparts a retention force on the SIM tray when the SIM tray is in the seated position, the retention force opposing the biasing force to retain the SIM tray in the seated position.

3. The portable electronic device of claim 2, wherein the SIM tray retaining mechanism comprises a spring member in contact with the SIM tray.

4. The portable electronic device of claim 1, wherein:
the portion of the exterior side surface of the portable electronic device is a first portion of the exterior side surface of the portable electronic device; and
the SIM tray, when in the seated position, defines a second portion of the exterior side surface of the portable electronic device.

5. The portable electronic device of claim 1, wherein the biasing spring is a conical spring.

6. The portable electronic device of claim 1, wherein the biasing spring is a coil spring.

7. The portable electronic device of claim 1, wherein the biasing force acts in a same direction as the actuation force.

8. The portable electronic device of claim 1, wherein a coil of the biasing spring is captured between two surfaces of the ejector plug, thereby securing the biasing spring to the ejector plug.

9. A portable electronic device comprising:
a display;
a housing surrounding the display and defining a first hole along an exterior side surface of the portable electronic device and a second hole along the exterior side surface of the portable electronic device;
a subscriber identity module (SIM) tray positioned in the first hole;
a SIM tray retaining mechanism configured to retain the SIM tray in a seated position;
a SIM tray ejection mechanism configured to displace the SIM tray in an outward direction, the SIM tray ejection mechanism comprising:
a push rod;
an ejector plug positioned in the second hole and configured to impart an actuation force to the push rod;
a tray ejector arm configured to displace the SIM tray in response to the actuation force being imparted to the push rod; and
a biasing spring coupled to the ejector plug and captured between the ejector plug and an interior surface of the housing, the biasing spring configured to bias the ejector plug against the push rod, thereby imparting a biasing force on the tray ejector arm via the push rod and biasing the tray ejector arm against the SIM tray when the SIM tray is in the seated position.

10. The portable electronic device of claim 9, wherein the tray ejector arm is configured to pivot about a pivot axis defined by a pivot member and defines:
a first portion extending from the pivot member along a first direction; and
a second portion extending from the pivot member along a second direction different than the first direction.

11. The portable electronic device of claim 10, wherein:
the push rod transfers the actuation force to the first portion of the tray ejector arm; and
the second portion of the tray ejector arm contacts the SIM tray to displace the SIM tray in response to the actuation force being imparted on the push rod.

12. The portable electronic device of claim 10, wherein:
the biasing spring is a first biasing member configured to impart a first biasing force on the tray ejector arm, the first biasing force acting in a first direction; and
the portable electronic device further includes a second biasing member configured to impart a second biasing force on the tray ejector arm, the second biasing force acting in a second direction different than the first direction.

13. The portable electronic device of claim 12, wherein the second direction is parallel to the pivot axis.

14. The portable electronic device of claim 13, wherein:
the first biasing member is a coil spring; and
the second biasing member is a beam spring.

15. The portable electronic device of claim 9, wherein the biasing spring is an elastomer member.

16. The portable electronic device of claim 9, wherein the biasing spring is a conical spring retained to the ejector plug.

17. A subscriber identity module (SIM) tray assembly for an electronic device, comprising:
a housing defining a first hole along an exterior side surface of the electronic device and a second hole along the exterior side surface of the electronic device;
a tray positioned in the first hole and configured to receive a SIM card;
a tray ejector arm configured to at least partially eject the tray from the housing;
an ejector plug positioned in the second hole and configured to receive an actuation force;
a push rod configured to transfer the actuation force from the ejector plug to the tray ejector arm; and
a biasing spring coupled to the ejector plug and captured between the ejector plug and an interior surface of the housing, the biasing spring configured to bias the ejector plug against the push rod, thereby imparting a biasing force on the tray ejector arm via the push rod and biasing the tray ejector arm against the tray.

18. The SIM tray assembly of claim 17, wherein:
the actuation force moves the push rod along a first direction; and
the tray ejector arm is configured to pivot about a pivot axis to at least partially eject the tray along a second direction opposite the first direction.

19. The SIM tray assembly of claim 17, wherein:
the biasing spring is a first biasing member that imparts a first biasing force on the tray ejector arm, the first biasing force acting along a first direction; and
the SIM tray assembly further comprises a second biasing member configured to impart a second biasing force on the tray ejector arm, the second biasing force acting along a second direction different than the first direction.

20. The SIM tray assembly of claim 19, wherein:
the SIM tray assembly further comprises a cover member extending over the tray; and
the second biasing member is a beam spring integrally formed with the cover member.

* * * * *